United States Patent [19]

Shimizu et al.

[11] Patent Number: 4,949,099

[45] Date of Patent: Aug. 14, 1990

[54] FLUORESCENT PRINTER HEAD USING A SINGLE FILAMENTARY CATHODE

[75] Inventors: Yukihiko Shimizu; Toshimitsu Fuyuki, both of Mobara; Toru Teshigawara, Ebina; Kazuo Terao, Ebina; Atsushi Kasao, Ebina, all of Japan

[73] Assignees: Futaba Denshi Kogyo Kabushiki Kaisha, Mobara; Fuji Xerox Company, Ltd., Tokyo, both of Japan

[21] Appl. No.: 254,570

[22] Filed: Oct. 7, 1988

[30] Foreign Application Priority Data

Oct. 7, 1987 [JP] Japan ................................ 62-251546

[51] Int. Cl.[5] ............................................ G01D 15/14

[52] U.S. Cl. ................................ 346/107 R; 346/160; 346/110 R

[58] Field of Search ................. 346/76 L, 108, 107 R, 346/160, 110 R, 110 V

[56] References Cited

U.S. PATENT DOCUMENTS 4,536,778 8/1985 De Schamphelacre et al. ... 346/107 R 4,633,271 12/1986 Segawa et al. .................. 346/107 R

FOREIGN PATENT DOCUMENTS 58-38967 3/1983 Japan .

59-51445 3/1984 Japan .

60-61273 4/1985 Japan .

61-203555 9/1986 Japan .

61-211956 9/1986 Japan .

62-71163 4/1987 Japan .

*Primary Examiner*—Mark J. Reinhart

*Attorney, Agent, or Firm*—Oblon, Spivak, McClelland, Maier & Neustadt

[57] ABSTRACT

A fluorescent printer head capable of rendering luminance of dot-like anodes along its main scanning direction uniform and stable to improve quality of printing in an optical printer. The fluorescent printer head includes dot-like anodes constituting a luminous area, control electrodes having apertures formed at positions corresponding to the dot-like anodes, and at least one filamentary cathode stretched above the control electrode extending along the middle portion of the luminous area.

5 Claims, 7 Drawing Sheets

FLUORESCENT PRINTER HEAD USING A SINGLE FILAMENTARY CATHODE

BACKGROUND OF THE INVENTION

1. Field of the Invention

This invention relates to a printer head, and more particularly to a write head for an optical printer utilizing the principle of a fluorescent display device.

2. Description of the Related Art

Optical printers utilizing various kinds of write heads have been proposed. The optical printer is generally constructed in such a manner as shown in FIG. 8. The optical printer shown in FIG. 8 includes a photosensitive drum A which acts as a record medium and is rotated about an axis 0 in the clockwise direction as shown in FIG. 8 so that its surface may be charged by an electrifier B. The surface of the photosensitive drum A is irradiated by dot-like light from a write head C to form a latent image of letters, figures or the like thereon. The latent image is then developed by a developing device D. Decalcomania papers F contained in a cassette E is fed between the surface of the photosensitive drum A and a transfer device G so as to transfer characters, figures or the like formed on the photosensitive drum A to the decalcomania paper F. The image transferred to the paper F is fixed on the paper by passing it through a thermal fixing device I. In FIG. 8, reference numeral H designates an erasing lamp for erasing charges remaining on the photosensitive drum A and J is a cleaning blade for cleaning the surface of the drum A.

Conventionally, an LED (light emitting diode), a CRT (cathode ray tube) or the like has been used as a write head C for such an optical printer. Also, an optical printer head has been recently developed which uses the principle of a vacuum fluorescent display device in addition to the light emission devices such as LED and the like in view of the reliability and the manufacturing costs.

The vacuum fluorescent display device is a kind of a multi-electrode electron tube which includes a casing evacuated to a high vacuum in which various electrodes and phosphor layers are contained.

Now, the conventional printer head using the vacuum fluorescent tube (hereinafter referred to as fluorescent printer bead) will be described.

The fluorescent printer head is classified into two types according to the direction of light emission, namely a VFD (vacuum fluorescent display) type and an FLVFD type (front luminous vacuum fluorescent display).

(1) VFD Type Fluorescent Printer Head

The VFD type fluorescent printer head includes phosphor-deposited anode conductors arranged on an inner surface of an anode substrate which is a part of an envelope so that the phosphor may give off light emission energized by electrons emitted from filamentary cathodes. The light is irradiated on a surface of a photosensitive drum through a transparent front cover opposite to the anode substrate. Such a VFD type fluorescent printer head is disclosed in Japanese Patent Publication No. 203555/1986.

(2) FLVFD Type Fluorescent Printer Head

The FLVFD type fluorescent printer head includes an anode substrate and anode conductors made of a light-permeable material. The light emitted from phosphor is irradiated on a surface of a photosensitive drum through the anode substrate and the anode conductors. Such a FLVFD type fluorescent printer head is disclosed in Japanese Patent Publication No. 61273/1985 and Japanese Patent Publication No. 51445/1984.

The conventional fluorescent printer head is also classified into five types according to an anode pattern which gives off dot-like emission.

(a) Single Type Fluorescent Printer Head

A plurality of dot-like anodes are arranged in a row at predetermined intervals and in parallel with a scanning direction of the dot-like anodes, namely, the direction parallel to the axis of the photosensitive drum shown in FIG. 8. Such a single type fluorescent printer head is disclosed in Japanese Patent Publication No. 38967/1983.

(b) Zigzag Type Fluorescent Printer Head

A plurality of dot-like anodes are arranged in two rows at predetermined intervals in a zigzag fashion in parallel with a scanning direction of the dot-like anodes. In the printer head of this type, timing of rotation of a photosensitive drum and emission from each of the anodes is adjusted so that dot-like light beams irradiated from the anodes linearly to the surface of the photosensitive drum in the direction parallel to an axis of the drum may form a continuous straight line. This printer head is disclosed in Japanese Patent Publication No. 61273/1985.

(c) Oblique Arrangement Type Fluorescent Printer Head

The fluorescent printer head includes a special anode pattern and is disclosed in U.S. Pat. No. 4,675,572.

The fluorescent printer head of this type will now be described with reference to FIG. 7. The printer head of the illustrated embodiment includes a substrate 1, at least three strip-like anode conductors 2 arranged on the substrate 1 in a manner to be parallel to one another at fixed intervals, a plurality of second control electrodes 3 arranged above the anode conductors 2 in a manner to obliquely cross a row of the anode conductors 2 in the scanning direction of the anode conductors and to be electrically separated from one another at fixed interval. The second control electrodes 3 each are made of a flat plate member and is provided at a central portion thereof with an elongated slits 4 extending in the direction obliquely crossing the array of the anode conductors 16. The conductors 2 each have a plurality of phosphor layers 5 deposited on portions opposite to the slits 4 of the second control electrodes 3 at fixed interval so as to form a plurality of obliquely arranged dot-like anodes 6. The obliquely arranged dot-like anodes 6 thus formed constitute a luminous area. Above the second control electrodes 3, there is provided a first control electrode 7 which serves as a diffusion electrode. The first control electrode 7 is made of a single plate material which is provided with slits 8 slightly larger than the slits 4 at the portions corresponding to the slits 4 of the second control electrodes 3. Thus, the phosphor layer 5 exposed through a gap between each adjacent two second control electrodes 3 is hidden by the first control electrode 7 if the phosphor layer 5 is deposited on the entire surface anode conductors 2, and the dot-like anodes 6 exposed through each corresponding slits 4 and 8 obliquely extending with respect to its scanning direction constitutes the luminous area. The printer head also includes two filamentary cathodes 9 stretched above the first control electrode 7 and deviated from the luminous area extending in a parallel with the array of the anode conductors. Reference numerals 10 and 11 designate a front cover and side plates which form a sealed envelope together with the substrate 1. The envelope is evacuated to a high vacuum The front cover 10 is provided with a plurality of focusing lenses, which are arranged in parallel with one another in the scanning direction of the dot-like anodes 6 on an outer surface of the front cover 10. The lenses serve to guide light beams irradiated from the dot-like anodes 6 through the front cover to a surface of a photosensitive drum.

Electrode terminals, such as, côntrol electrode terminals 12 lead out from the sealed envelope and the like are connected to a driver circuit (nof shown). The dot-like anodes 6 each is scanned by means of a time-division pulse signal and a positive display pulse signal is applied to the second control electrodes 3 desired in synchronism with the scanning so that dot-like anodes 6 may selectively carry out emission. However, electrons emitted from the filamentary cathodes 9 often impinge those phosphor layers 5 from which emission is not desired, which results in leakage emission. In order to prevent such a defect, a negative voltage is applied to the second control electrodes 3 for the anodes 6 which are not desired to carry out emission.

The fluorescent printer head constructed described above is arranged in the optical printer so that the rotating axis 0 of the photosensitive drum A serving as a record medium is parallel to the scanning direction of the anode conductors 2. This causes the arrays of the dot-like anodes 6 belonging to each group to be oblique with respect to the axis 0 of the photosensitive drum. However, suitable electrical signal treatment for adjusting the timing of emission of each the phosphor layer 5 depending upon the rotational speed of the photosensitive drum A causes a dot-like light irradiated from each of the dot-like phosphor layer to form a straight line on a surface of the photosensitive drum A parallel to its axis 0.

Further, the fluorescent printer head is divided into three types depending on the number of filamentary cathodes used in the printer head.

(i) Single-Cathode Type Fluorescent Printer Head

Japanese Patent Publications No. 61273/1985 and No. 51445/1984 disclose the fluorescent printer head in which a single filamentary cathode is used. The fluorescent printer head is the FLVFD type and the single type or zigzag type in terms of the anode pattern. In the printer head of this type, the single filamentary cathode is stretched right above a rear side of a luminous area which is formed of a plurality of anodes.

(ii) Two-Cathode Type Fluorescent Printer Head

The fluorescent printer head of the VFD and FLVFD types includes two filamentary cathodes as disclosed in Japanese Patent Publications No. 203555/1986 and No. 61273/1985. The two filamentary cathodes are arranged above both sides of dot-like anodes in parallel with the anodes. The oblique arrangement type fluorescent printer head described above includes two filamentary cathodes stretched above both sides of the luminous area.

(iii) Multi-Cathode Type Fluorescent Printer Head

Japanese Patent Publication No. 71163/1987 discloses a multi-cathode type fluorescent printer head which includes three or more filamentary cathodes divided into two groups, wherein the cathodes of both groups are stretched above both sides of the anode arrays.

As is apparent from the foregoing explanation, a single cathode is used for the fluorescent printer heads of the FLVFD type having the single type or zigzag type anode pattern. The oblique arrangement type and VFD type fluorescent printer heads do not employ the single cathode. The reason is considered to be as follows:

It is considered that a single filamentary cathode stretched right above anodes lying between the luminous section and the record medium is obstructive of irradiation of dot-like light beams, which results in a shadow of the filamentary cathode and creates undesired lines on the record medium. Therefore, the single cathode type is applied to the FLVFD type fluorescent printer head which irradiates light in the direction opposite to the filamentary cathode, because it is free of such a problem. Accordingly, two filamentary cathodes are arranged on both sides of the luminous section of dot-like anodes in the oblique arrangement type and VFD type fluorescent printer head in order to prevent an shadow of the filamentary cathodes from being formed.

However, the two-cathode arrangement is disadvantageous as shown in FIG. 5(*b*) in which relative luminance between the dot-like anodes 6 in each row obliquely extending along the slits 4 and 8 when operating the fluorescent printer head employing the two-cathode arrangement is shown. As is apparent from FIG. 5(*b*), luminance of the anodes at both ends of each row is larger by 50% or more than that of the anodes at the central region of each row. In this manner, the slits irradiating light of different luminance are scanned to project the light on the photosensitive drum. The repetition of such an uneven luminance array on the photosensitive drum on a straight line in the scanning direction of the anode conductors parallel to the axis of the photosensitive drum causes periodical luminance variation in the scanning direction of the anode conductors as shown in FIG. 6(*b*). This causes deterioration of quality of printing by the optical printer, because the printing is non-uniform.

As a result of research and experimentation, it was found that such a problem is resulted from the two-cathode arrangement.

The conventional optical printer, as shown in FIG. 7, includes two such filamentary cathodes stretched on both sides of the anode array (eight anodes in FIG. 7) arranged in parallel with one another. Accordingly, both ends of the anode array are close to the filamentary cathodes and the distance is gradually increased toward the center of the anode array. In general, luminescence increases in proportion to the distance between the filamentary cathode and the control electrode becomes shorter. Accordingly, relative luminance among the dot-like anodes 6 obliquely extending along the slits 4 and 8 is as shown in FIG. 5(*b*). Namely, the anodes positioned at both side ends of the anode array exhibit maximum luminance and the anode positioned at the middle of the anode array exhibits minimum luminance. Also, the filamentary cathodes are stretched at both side ends thereof by anchors. This causes misregistration of the cathodes due to vibration during operation, which results in nonuniform luminance.

In addition, distribution of current density on the anodes in the conventional fluorescent printer head having two-cathodes is shown in FIG. 9(*b*). As is apparent from FIG. 9(*b*), the current density at the center of the filamentary cathodes is lowest. This is because electrons emitted from one of the filamentary cathodes travelling toward the other filamentary cathode or the center of the dot-like anode array are repelled by negative potential applied to the other cathode, and the density of electrons at the center of the anode array become less, which results in decrease in impingement of electrons on the center of dot-like anode array, and also decrease in the relative luminance.

SUMMARY OF THE INVENTION

The present invention has been made in view of the foregoing disadvantage of the prior art.

Accordingly, it is an object of the present invention to provide a fluorescent printer head of the VFD type having oblique anode pattern which is capable of exhibiting uniform luminance in the scanning direction of anodes.

The printer head according to the present invention includes phosphor-deposited anodes arranged on a substrate so as to constitute a luminous area emitting out dot-like light beams, control electrodes for controlling emission from the anodes, a single filamentary cathode arranged opposite to the anodes having the control electrodes interposed therebetween, an envelope for receiving the respective electrodes therein which is evacuated to a high vacuum, and a lens system for irradiating dot-like light beams emitted from the anodes onto an external record medium.

The fluorescent printer head of the present invention includes the single filamentary cathode. Accordingly, a distance between the filamentary cathode and the anodes is uniform as compared with a fluorescent printer head employing two filamentary cathodes, which significantly improves difference in luminance between inner anodes and outer anodes and ensures uniform and stable luminance along scanning direction of the anodes as compared with the prior art. Furthermore, according to the present invention, the filamentary cathode is located at the position between the anodes and the lens system. Thus, an image of the filamentary cathode does not form on the record medium which significantly improve quality of printing by an optical printer, because the position of the filamentary cathode is deviated from a focus of the lens system or the position of the anodes.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals generally designate like or corresponding parts; wherein:

FIG. 5(*b*) is a graphical representation showing relative luminance between dot-like anodes arranged along an oblique slit in a conventional fluorescent printer having oblique anode pattern;

FIG. 6(*b*) is a graphical representation showing relative luminance between anodes along scanning direction of anodes in a fluorescent printer head having oblique anode pattern;

FIG. 9(*b*) is a diagram showing a distribution of current density of anodes in a fluorescent printer head including two filamentary cathodes.

DETAILED DESCRIPTION OF THE PREFERRED EMBODIMENTS

Now, a fluorescent printer head according to the present invention will be described with reference to the accompanying drawings.

Figure 1:
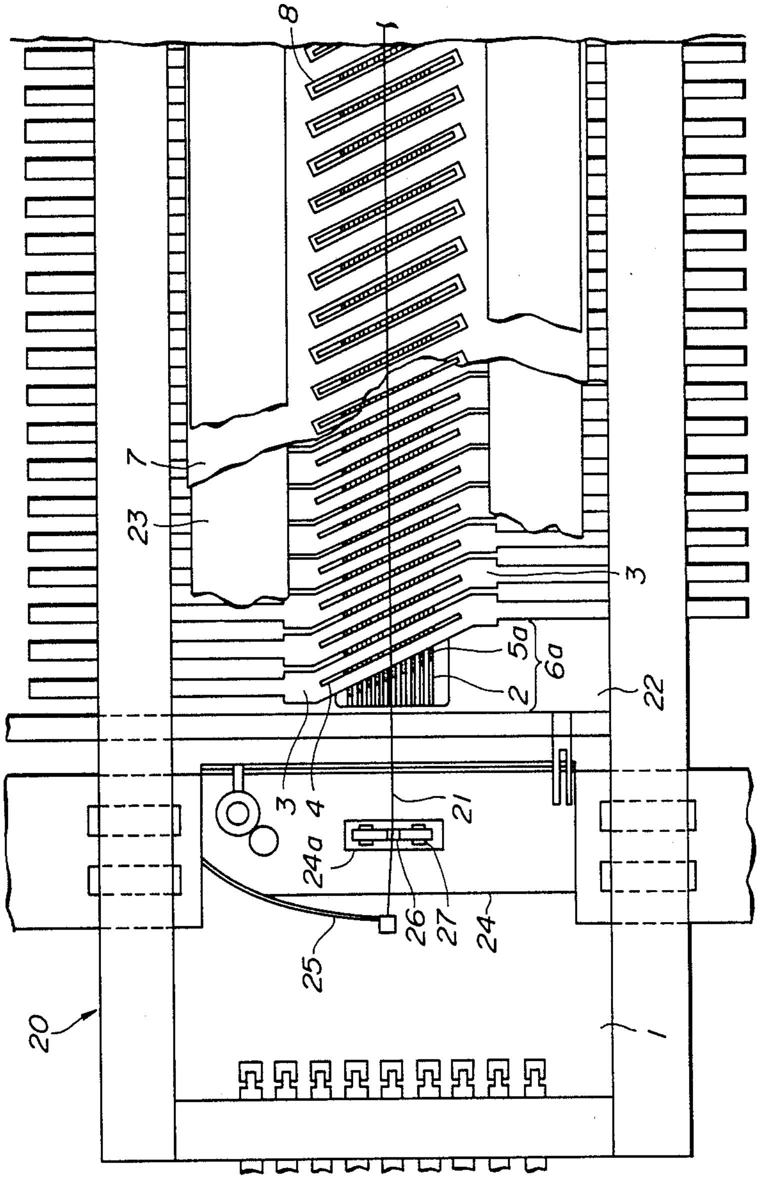
FIG. 1 is a fragmentary plan view showing a first embodiment of a fluorescent printer head according to the present invention.
Figure 2:
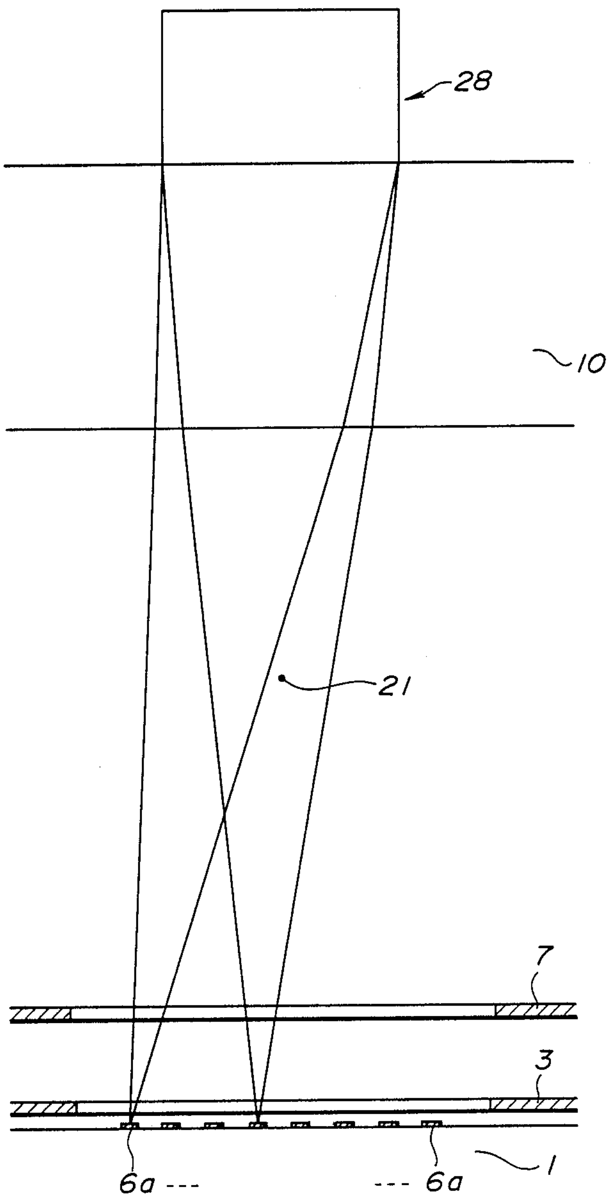
FIG. 2 is a schematic sectional view of the printer head shown in FIG. 1.
Figure 7:
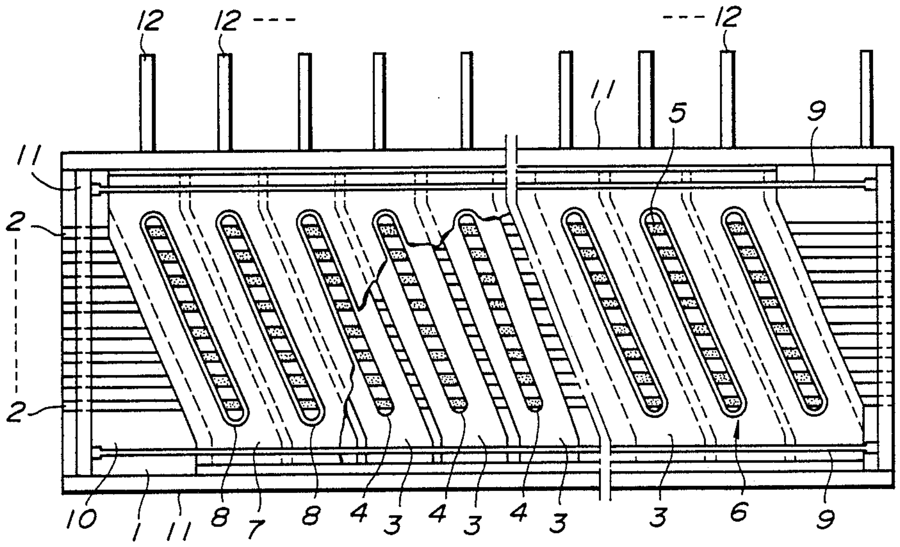
FIG.7 (PRIOR ART)
FIG. 7 is a plan view showing a conventional VFD fluorescent printer head having oblique anode pattern.
Figure 8:
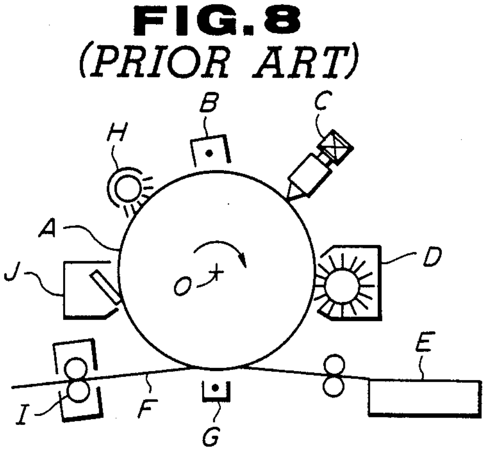
FIG.8 (PRIOR ART)
FIG. 8 is a schematic view showing a general structure of an optical printer head.
Figure 9:
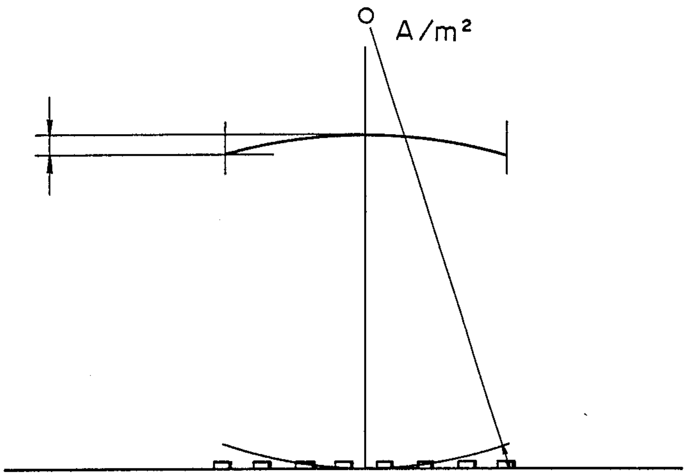
FIG. 9(*a*) is a diagram showing a distribution of current density of anodes in a fluorescent printer head including a single filamentary cathode.
Figure 9:
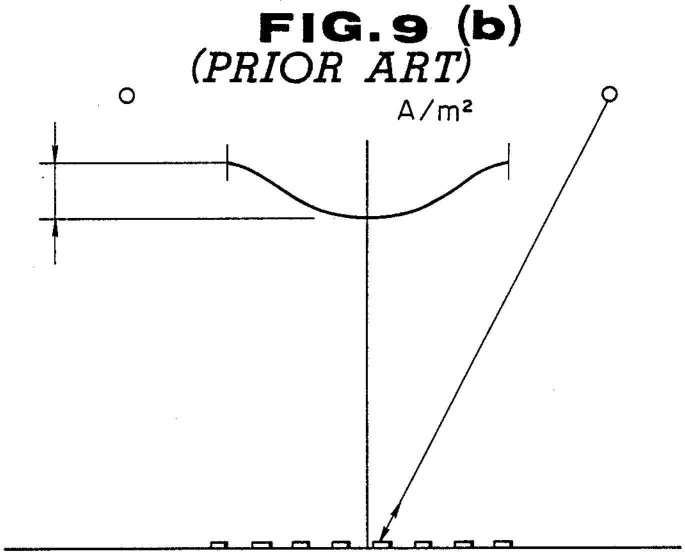
FIG. 9 (b) (PRIOR ART)

FIGS. 1 and 2 show a first embodiment of a fluorescent printer head according to the present invention. The fluorescent printer head of the illustrated embodiment generally designated by reference numeral 20 is the VFD type having oblique anode pattern which is substantially the same construction and function as the conventional printer head described above with reference to FIG. 7, except the number of a filamentary cathode 21 and the manner of stretching of the cathode. Accordingly, the following description will be made mainly in connection with the filamentary cathode 21.

The fluorescent printer head 21 includes eight anode conductors Z arranged in parallel with on another and at predetermined intervals on an inner surface of a substrate 1 which is a part of a box-like envelope. The anode conductors 2 each have a phosphor layer 5*a* deposited on its entire surface, thereby to form anodes 6*a*. The substrate 1 is deposited an insulating layer 22 on portions thereof around the anodes 6*a*, above which a plurality of second control electrodes 3 are arranged so as to straddle the anodes 6*a*. The second control electrodes 3 have terminals led out separately from one another from the envelope, respectively. A first control electrode 7 is provided above the second control electrodes 3 through insulating spacers 23. The first control electrode 7 is integrally made of a single sheet material. The control electrodes 3 and 7 include slits 4 and 8 obliquely extending at an angle with respect to a longitudinal direction of the anodes 6*a* parallel to scanning direction of the anodes, respectively. Thus, dot-like portions of the anodes 6*a* exposed through each of the slits 4 constitute an effective luminous section. A plurality of the dot-like luminous sections obliquely arranged along the slits 4 constitute a luminous area.

The fluorescent printer head of the illustrated embodiment includes a single filamentary cathode 21 provided above the first control electrode 7 opposite to the luminous area. The single filamentary cathode 21 is stretched so as to be positioned right above a gap between two central anodes 6a and extend in the longitudinal direction of the anodes 6a. The filamentary cathode 21 is fixed at both ends thereof on anchors 25 of cathode supports 24 provided on both ends of the substrate 1 by welding. The anchors 25 each exert elastic force in the longitudinal direction so that the filamentary cathode 21 may be stretched under predetermined tension. The substrate 1 is provided with guide plates 27 which are securely positioned adjacent to the cathode support 24, each of which is formed on an upper surface thereof with a groove 26. The guide plates 27 each are upwardly projected through a through-hole 24a formed at each of the cathode supports 24. The filamentary cathode 21 is stretched precisely just above the luminous area to be guided by the grooves 26 of the guide plates 27 at portions adjacent to its both ends. The guide plates 27 may be formed of wear resistance material such as, for example, a zirconia type ceramic material, an alumina type ceramic material, a metal material, such as, Cr, Ti or W, or the like.

The fluorescent printer head, as shown in FIG. 2, also includes a lens system 28 arranged on an outer surface of a front cover 10 provided opposite to the substrate 1 on which the luminous area is formed. The lens system 28 comprises bar-like or columnar lenses which are a kind of self-focusing fibers and closely arranged side by side. The anodes 6a are positioned at the focal point of the lens system 28 downwardly spaced by a predetermined distance $l_O$ from the center of the lens system 28 shown in FIG. 2 so that dot-like light beams emitted from the anodes 6a may be covered through the lens system 28, to thereby form an image at the focal point (not shown) of the lens system 28 upwardly spaced by the distance $l_O$ from the lens system shown in FIG. 2. A photosensitive drum A as a record medium is so arranged that its surface positionally coincides with the image formation position.

The depth of focus $\Delta l$ the lens system 28 using the self-focusing fibers is considerably small. It is as small as, for example, about ±50–60μm. Accordingly, the image of the filamentary cathode 21 is not formed on the photosensitive drum A, because it is generally located at the position separated by a distance 20 times as long as the depth of focus $\Delta l$ in the direction toward the lens system from the anodes 6a located at the focal point. Also, formation of a shadow of the filamentary cathode 21 on the photosensitive drum A can be avoided, because a diameter of the filamentary cathode 21 is as small as 20–50μm. Thus, in the illustrated embodiment, the disadvantages of the prior art can be eliminated by arranging the single filamentary cathode right above the center of the luminous area.

Figure 5:
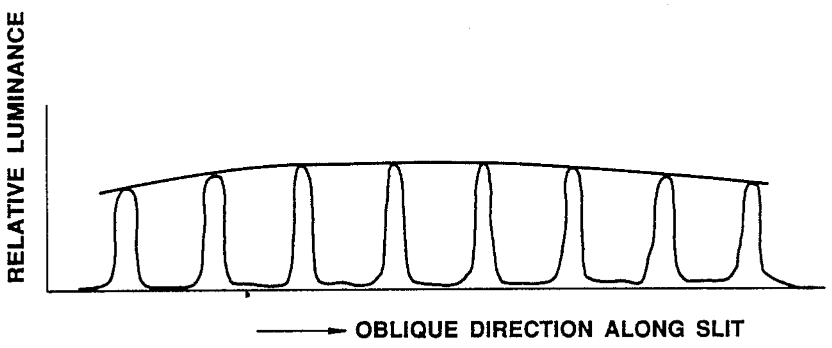
FIG. 5(*a*) is a graphical representation showing relative luminance between dot-like anodes arranged along an oblique slit in the first embodiment shown in FIG. 1.
Figure 5:
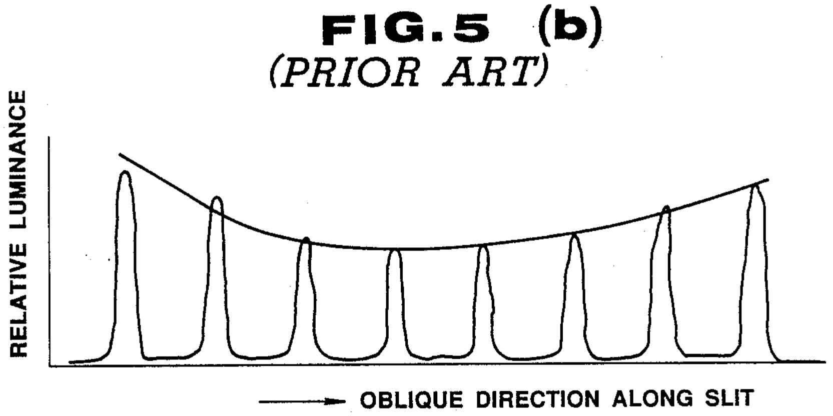
FIG. 5 (b) (PRIOR ART)
Figure 6:
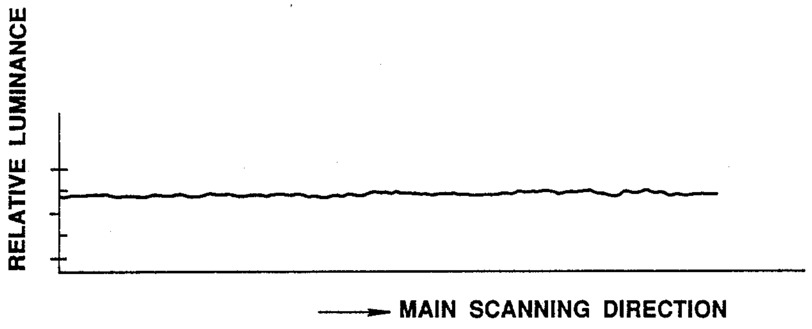
FIG. 6(*a*) is a graphical representation showing relative luminance between anodes along scanning direction of anodes in the first embodiment shown in FIG. 1.
Figure 6:
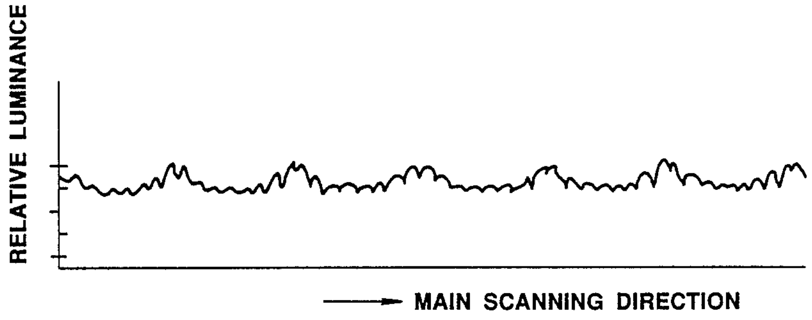
FIG. 6 (b) (PRIOR ART)

Relative luminance between the dot-like anodes 6a in each row obtained by driving the fluorescent printer head when operating the optical printer is as shown in FIG. 5(*a*). As is apparent from FIG. 5(*a*), the anodes exhibits substantially uniform luminance in an oblique direction along the slits 4 and 8. Accordingly, they exhibit substantially uniform luminance in the scanning direction of the anodes as shown in FIG. 6(*a*). Thus, the fluorescent printer head of the present invention is capable of exhibiting uniform luminance in the scanning direction of the anode, thereby to insure printing at high quality and eliminating the problems of the prior art. Furthermore, it is recognized that a shadow of the filamentary cathode 21 does not form on the photosensitive drum A in spite of arranging the single filamentary cathode 21 at the intermediate region between the luminous area and lens system 28.

Figure 3:
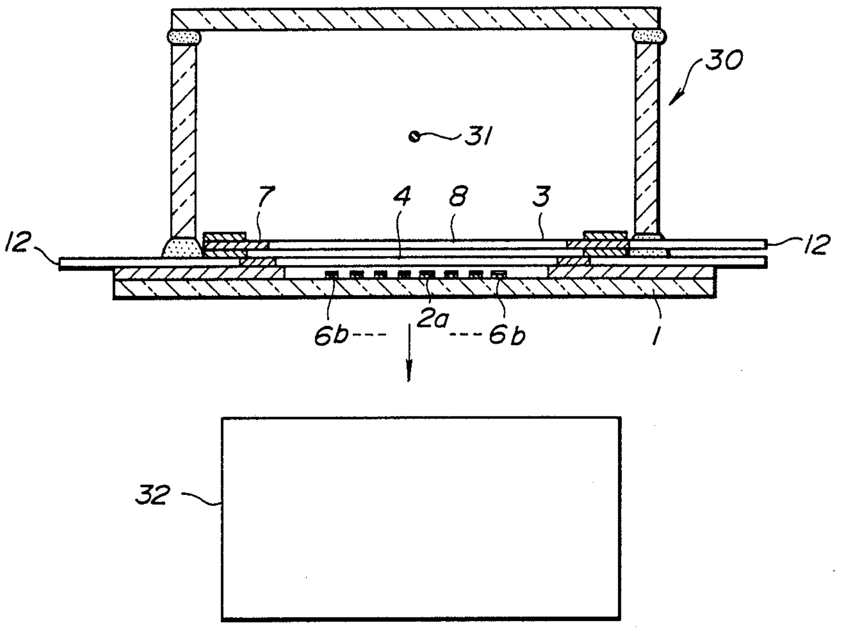
FIG. 3 is a sectional view showing a second embodiment of a fluorescent printer head according to the present invention.

FIG. 3 shows a second embodiment of a fluorescent printer head according to the present invention, wherein a fluorescent printer head is generally designated by reference numeral 30. The printer head 30 shown in FIG. 3 is the FLVFD type having oblique anode pattern. The fluorescent printer head includes a single filamentary cathode 31 stretched above a luminous area as in the first embodiment described above. Parts of the second embodiment corresponding to those of the first embodiment will be designated by like reference numerals. The printer head shown in FIG. 3 is the FLVFD type. Accordingly, the anode conductors 2a formed on an substrate 1 is required to have light-permeability. The anode conductors 2a may be made of a mesh-like aluminum deposited or a transparent conductive film such as an ITO film. Also, the fluorescent printer head includes a lens system 32 which is arranged on an outer surface of the substrate contrary to the first embodiment. This printer head not only effectively prevents a shadow of the filamentary cathode from projecting onto a photosensitive drum but exhibits the same functions and advantages as the first embodiment. Thus, it will be noted that the printer head shown in FIG. 3 effectively eliminates the disadvantages inherent in the fluorescent printer head having the oblique pattern.

Figure 4:
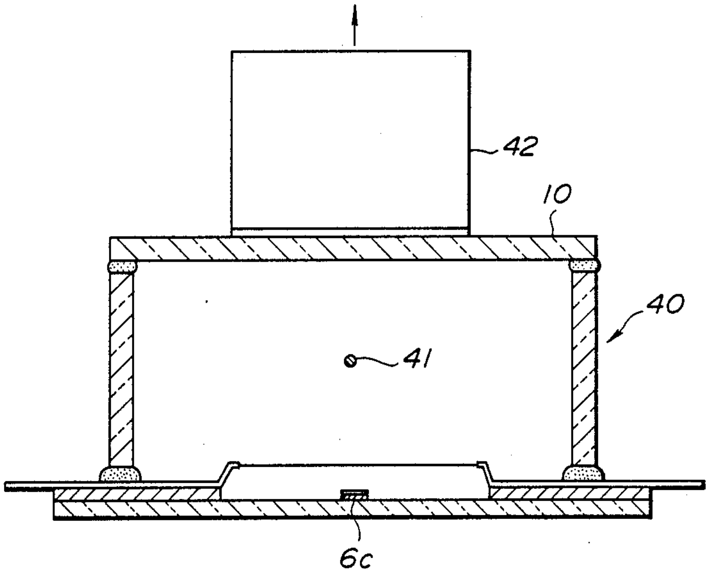
FIG. 4 is a sectional view showing a third embodiment of fluorescent printer head according to the present invention.

FIG. 4 shows a third embodiment of a fluorescent printer head according to the present invention, wherein a fluorescent printer head is generally designated by reference numeral 40. The printer head 40 shown in FIG. 4 is the VFD type having a single cathode. The fluorescent printer head includes a single filamentary cathode 41 which is stretched in scanning direction of anode between dot-like anodes 6c and a lens system 42. The fluorescent printer head exhibits substantially the same functions and advantages as the first embodiment described above. In this embodiment, an anode pattern of the zigzag type can be applied.

As can be seen from the foregoing, the fluorescent printer head of the present invention is so constructed that the single filamentary cathode is stretched opposite to the luminous area above the central region of the luminous area having the control electrodes spacedly interposed therebetween. This structure permits luminace of the luminous sections along the scanning direction of anodes to be uniform and stable, and significantly improves the quality of printing by an optical printer eliminating the presence of a shadow of the filamentary cathode as observed in the prior art.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed as new and desired to be secured by Letters Patent of the U.S. is:

1. A fluorescent printer head comprising:

a vacuum fluorescent display tube having an evacuated envelope formed of a substrate, side walls and a front cover;

a lens system arranged on an outer surface of said front cover for passing luminescent light emitted from said fluorescent display tube therethrough to form an image on a record medium, said evacuated envelope including, a plurality of strip-like linear anode conductors arranged on said substrate, said anode conductors being arranged in parallel having intervals between each adjacent two anode conductors at the focal point of said lens systems spaced by a predetermined distance from said lens system, a phosphor layer deposited on each of said anode conductors functioning as a luminous area for emitting light, a plurality of control electrodes each having an aperture, said control electrodes being arranged above said strip-like linear anode conductors so as to have said aperture opposite to said phosphor layer obliquely crossing a row of said anode conductors to define luminous dots in cooperation with said anode conductors and being in parallel having gap between each adjacent two control electrodes, and a single filamentary cathode stretched above said control electrodes extending in the longitudinal direction of said anode conductors along the center of said luminous area, said filamentary cathode being positioned outside the depth of focus of said lens system as viewed from said anode conductors.

2. The fluorescent printer head as defined in claim 1, wherein said phosphor layer is deposited on the entire surface of said strip-like linear conductors.

3. The fluorescent printer head as defined in claim 1, wherein said substrate is provided with guide plates having a groove on the upper surface thereof for guiding said filamentary cathode to stretch above said luminous area by cathode supports having anchors which exert tension on said filamentary cathode.

4. The fluorescent printer head as defined in claim 3, wherein said guide plates are made of wear resistance material.

5. The fluorescent printer head as defined in claim 3, wherein said cathode supports are provided with a through-hole through which said guide plates are projected.

* * * * *